United States Patent
Fu et al.

(10) Patent No.: US 12,001,672 B2
(45) Date of Patent: Jun. 4, 2024

(54) INTERFACE DISPLAY METHOD AND APPARATUS FOR CONTROLLING INTERACTABILITY OF SIMULTANEOUSLY DISPLAYED USER INTERFACES OF AN APPLICATION

(71) Applicant: BEIJING XIAOMI MOBILE SOFTWARE CO., LTD., Beijing (CN)

(72) Inventors: Kaipeng Fu, Beijing (CN); Xiuquan Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/488,161

(22) Filed: Sep. 28, 2021

(65) Prior Publication Data
US 2022/0308752 A1 Sep. 29, 2022

(30) Foreign Application Priority Data
Mar. 26, 2021 (CN) .......................... 202110328613.8

(51) Int. Cl.
*G06F 3/04886* (2022.01)
*G06F 9/451* (2018.01)

(52) U.S. Cl.
CPC .......... *G06F 3/04886* (2013.01); *G06F 9/451* (2018.02); *G06F 2203/04803* (2013.01)

(58) Field of Classification Search
None
See application file for complete search history.

(56) References Cited

U.S. PATENT DOCUMENTS

| | | | |
|---|---|---|---|
| 7,660,488 B2 * | 2/2010 | Reicher | G09G 5/02 382/128 |
| 2006/0288305 A1 * | 12/2006 | Liu | G06F 3/0481 715/781 |
| 2013/0080938 A1 * | 3/2013 | Reeves | G06F 16/51 715/761 |
| 2014/0047413 A1 * | 2/2014 | Sheive | G06F 8/33 717/110 |

(Continued)

FOREIGN PATENT DOCUMENTS

WO 2019184348 A1 10/2019
WO WO-2022002188 A1 * 1/2022

OTHER PUBLICATIONS

Keller et al., "How to use Split Screen in Safari on iPad" (Year: 2020).*

(Continued)

*Primary Examiner* — William L Bashore
*Assistant Examiner* — Gabriel Mercado
(74) *Attorney, Agent, or Firm* — Arch & Lake LLP (57) ABSTRACT

An interface display method of an application is provided. The interface display method of an application may include: displaying a first user interface of the application; and in response to detecting a startup operation for a second user interface of the application, controlling states of components used to display the first user interface and the second user interface as a visible state, so that the first user interface and the second user interface are simultaneously displayed on a display panel, and the second user interface is a sub-interface of the first user interface.

17 Claims, 6 Drawing Sheets

(56) References Cited

U.S. PATENT DOCUMENTS

| | | | |
|---|---|---|---|
| 2014/0331174 A1* | 11/2014 | Wen | G06F 3/04883 |
| | | | 715/804 |
| 2015/0286344 A1* | 10/2015 | Kaufthal | G06F 3/0481 |
| | | | 715/788 |
| 2016/0062648 A1 | 3/2016 | Jeong et al. | |
| 2018/0329550 A1* | 11/2018 | Dellinger | G06F 3/04883 |
| 2018/0329590 A1* | 11/2018 | Garg | G06F 3/04842 |
| 2019/0339855 A1* | 11/2019 | Walkin | G06F 3/04883 |
| 2020/0274914 A1* | 8/2020 | Vazquez | G06F 3/04842 |
| 2020/0326844 A1 | 10/2020 | Hwang et al. | |
| 2021/0055856 A1* | 2/2021 | Capurso | G06T 7/74 |
| 2021/0216176 A1* | 7/2021 | Walkin | G06F 3/04845 |
| 2022/0244971 A1* | 8/2022 | Van Der Vlist | G06F 9/451 |
| 2022/0317836 A1* | 10/2022 | Dong | G06F 3/0482 |

OTHER PUBLICATIONS

Preview_WO_2022002188_A1_H "Machine Translation" (Year: 2020).*

Extended European Search Report issued in EP Application No. 21210559.7 dated May 16, 2022, (8p).

* cited by examiner

INTERFACE DISPLAY METHOD AND APPARATUS FOR CONTROLLING INTERACTABILITY OF SIMULTANEOUSLY DISPLAYED USER INTERFACES OF AN APPLICATION

CROSS REFERENCE

This application claims the priority to Chinese Application No. 202110328613.8, field on Mar. 26, 2021, the content of which is incorporated herein by reference in its entirety for all purposes.

TECHNICAL FIELD

The present disclosure relates to the field of interface control, and in particular to an interface display method and apparatus of an application.

BACKGROUND

A user interface is a medium for interaction and information exchange between an operating system and a user. The Android system (which is one kind of an operating system) presents the user interface based on an Activity component (which is one of four major components in the Android system).

SUMMARY

According to a first aspect of the present disclosure, there is provided an interface display method of an application. The interface display method for an application may include: displaying a first user interface of the application; and in response to detecting a startup operation for a second user interface of the application, controlling states of components used to display the first user interface and the second user interface as a visible state. In such visible state, the first user interface and the second user interface are simultaneously displayed on a display panel, and the second user interface is a sub-interface of the first user interface.

According to a second aspect of the present disclosure, there is provided an electronic device. The electronic device may include a processor and memory for storing instructions executable by the processor; in which, the processor is configured to display a first user interface of the application; and in response to detecting a startup operation for a second user interface of the application, control states of components used to display the first user interface and the second user interface as a visible state. In the visible state, the first user interface and the second user interface are simultaneously displayed on a display panel, and the second user interface is a sub-interface of the first user interface.

According to a third aspect of the present disclosure, there is provided a non-transitory computer-readable storage medium, in which when the instructions in the storage medium are executed by a processor, steps of an interface display method for an application are implemented. The interface display method of the application may include: displaying a first user interface of the application; and in response to detecting a startup operation for a second user interface of the application, controlling states of components used to display the first user interface and the second user interface as a visible state. In the visible state, the first user interface and the second user interface are simultaneously displayed on a display panel, and the second user interface is a sub-interface of the first user interface.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show examples consistent with the disclosure, and together with the specification are used to explain the principle of the disclosure.

DETAILED DESCRIPTION

The exemplary embodiments will be described in detail here, and examples of the present disclosure are shown in the accompanying drawings. When the following description refers to the drawings, unless otherwise indicated, the same numbers in different drawings indicate the same or similar elements. The implementation manners described in the following exemplary embodiments do not represent all implementation manners consistent with the present disclosure. Rather, they are merely examples of devices and methods consistent with some aspects of the present disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

During the running of the Android system, various system services or applications may create multiple Activity components, but at a certain moment, the system only allows one Activity component to run in the foreground, and does not support split-screen displaying of multiple user interfaces of the application.

The examples of the present disclosure provide an interface display method of an application, which can display a plurality of user interfaces of one application on a display panel at the same time to meet user requirements.

The user interface is the medium for interaction and information exchange between the operating system and the user. On the one hand, the user interface is used to display various contents to the user, and on the other hand, it is also used to monitor and respond to the user's operation behavior.

The aforementioned operating system can be, but is not limited to, an Android system, an iOS system, a Symbian system, and the like. Taking the Android system as the operating system as an example, in the Android system, a user interface is presented based on an Activity component. One Activity component is equivalent to an interface, and respective applications may create multiple Activity components.

Figure 1:
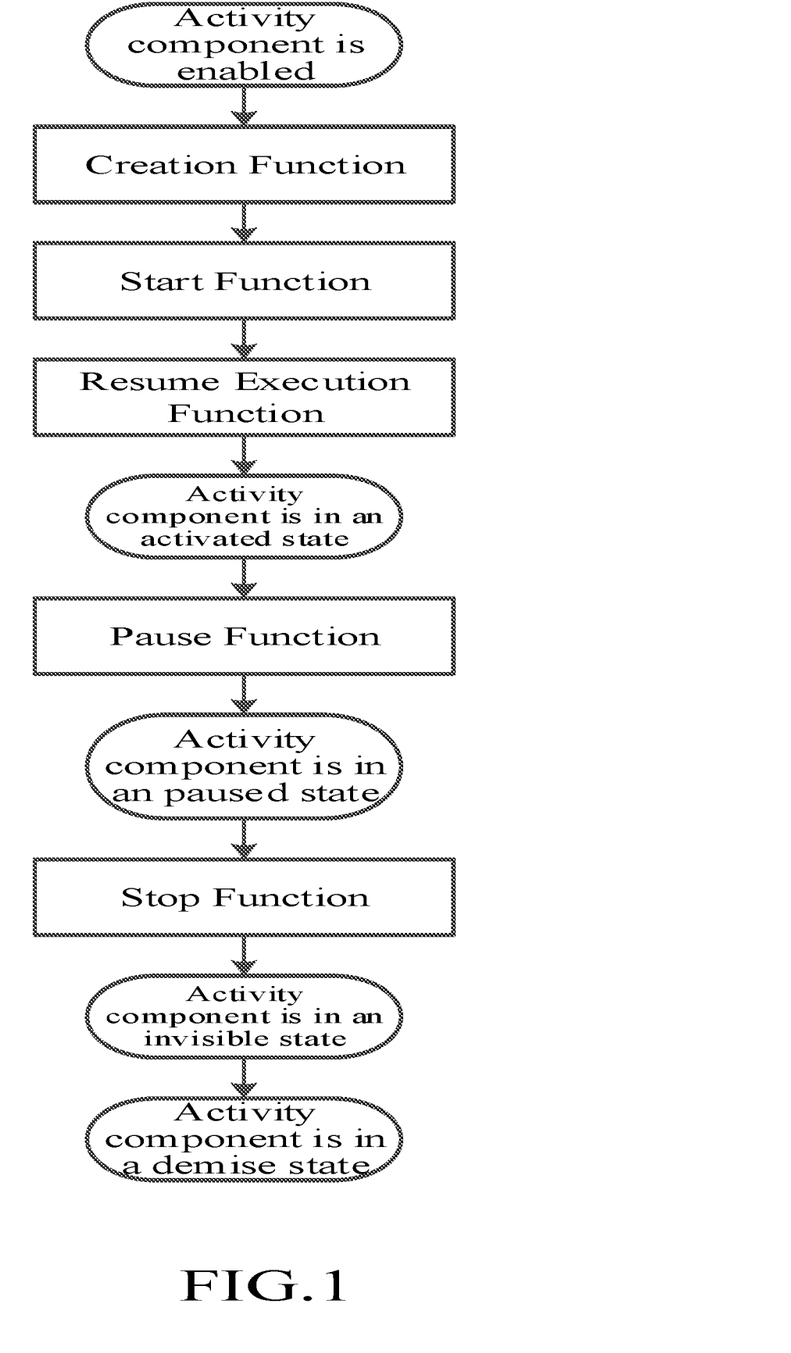
FIG. 1 is a schematic diagram showing a life cycle state of a component for displaying a user interface according to one or more examples of the present disclosure.

Activity components have a life cycle. So-called life cycle of an Activity component refers to various states that the Activity component goes through from start to end, that is, the transition from one state to another state, from nothing to something and to nothing again, states experienced in such process is called the life cycle. Referring to FIG. 1, FIG. 1 shows four life cycle states of the Activity component, which are an activated state, a paused state, a stopped state, and a demise state. An Activity component is enabled by successively calling a creation function (onCreate( )), a start function (onStart( )) and a resume execution function (onResume( )), then the life cycle state of the Activity component is in the activated state, and the user interface whose Activity component is in the activated state is visible and can interact with the user. The above process belongs to a creation process of the Activity component. Next is a demise process of the Activity component. When the Activity component is partially obscured by another transparent or Dialog style Activity component or pop-up window, a pause function (onPause( )) is called, and the Activity component is in the paused state. The user interface whose Activity component is in the paused state is visible but cannot interact with the user. When the Activity component is covered by another Activity component, a stop function (onStop( )) is called, and the Activity component is in the stopped state. The user interface whose Activity component is in the stopped state is invisible. When the Activity component is recycled by the operating system or is not enabled, the Activity component is in the demise state.

It should be noted that the above life cycle states are not all non-reentrant. Activity components that are not in the demise state, such as activity components in the paused state or stopped state, still have data related to the Activity components, that is, have not cleared data related to the Activity components from the local running memory, so the life cycle state is reentrant. For example, if the user interface whose life cycle state of the Activity component is in the activated state is partially obscured or blocked by a pop-up window, the life cycle state of the Activity component of the user interface is switched from the activated state to the paused state. When the pop-up window disappears, the life cycle state of the Activity component of the user interface is switched from the paused state back to the activated state by function calling. Once the life cycle state of the Activity component enters the demise state, the data related to the Activity component is cleared from the local running memory at this time, and the life cycle state of the Activity component cannot be switched to other states, which is different from the paused state and the stopped state.

The interface display process of the application of the example of the present disclosure will be described in detail below with reference to FIG. 1.

Figure 2A:
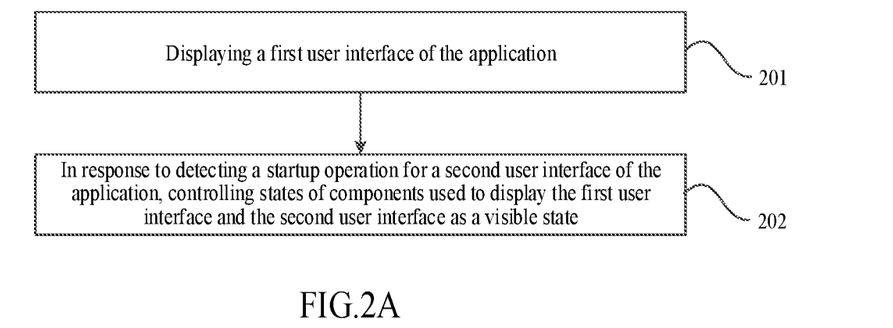
FIG. 2A is a flowchart showing an interface display method of an application according to one or more examples of the present disclosure.

FIG. 2A is a flow chart showing an interface display method of an application according to an example of the present disclosure. The method includes the following steps.

In step 201, a first user interface of the application is displayed.

By calling the following functions in turn: onCreate( )→onStart( )→onResume( ), the first user interface of the application is displayed on the display panel, and the life cycle state of the Activity component of the first user interface is in the activated state, which means that the first user interface is visible and can interact with the user. If the first user interface is partially obscured by a pop-up window, the life cycle state of the Activity component of the first user interface is switched from the activated state to the paused state, and the first user interface is visible but cannot interact with the user. When the pop-up window disappears, the life cycle state of the Activity component of the first user interface is switched from the paused state back to the activated state, and the first user interface is visible and can interact with the user, so the user can perform touch operations on the first user interface.

In the examples of the present disclosure, the activated state and the paused state are collectively referred to as a visible state, which means when the life cycle state of the Activity component is the activated state or the paused state, the Activity component is in the visible state, and the stopped state and the demise state are collectively referred to as an invisible state, which means when the life cycle state of the Activity component is the stopped state or the demise state, the Activity component is in the invisible state.

In one example, in case that the user interface of any application is not displayed on the current display panel and the first user interface is a homepage of the application, the first user interface can be displayed in a full-screen mode, that is, the window of the first user interface is displayed as a largest window on the display panel, thus covering the entire display panel.

Figure 2B:
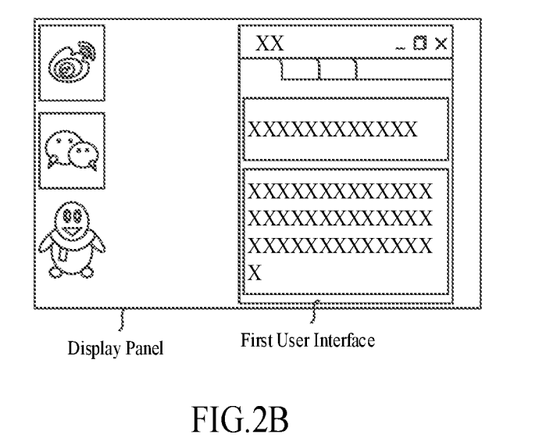
FIG. 2B is a schematic diagram showing content displayed on a display panel according to one or more examples of the present disclosure.

In one example, in case that the user interface of any application is not displayed on the current display panel and the first user interface is the home page of the application, the first user interface can also be displayed in a split-screen mode. In the scenario of the split-screen mode display, the first user interface may be displayed in a designated display area of the display panel. For example, in response to the display panel is in a landscape state, the designated display area is set as the right side of the display panel, such as shown in FIG. 2B, the first user interface is displayed on the right side of the display panel. In response to the display panel is in a portrait state, the designated display area is set as the lower side of the display panel, so the first user interface is displayed on the lower side of the display panel.

In one example, before displaying the first user interface in the split-screen mode, whether the first user interface meets a predefined split-screen display rule is determined firstly. In response to determining that the first user interface meets the split-screen display rule, the first user interface is displayed in the split screen mode. In response to determining that the first user interface does not meet the split screen display rule, the first user interface is displayed in the full screen mode.

Among them, the split-screen display rule may include, but is not limited to, at least one of the following: a minimum display size allowed by the interface is smaller than a split-screen display size; a minimum display resolution allowed by the interface is smaller than a split-screen display resolution; and the interface is a designated interface. The minimum display size allowed by the interface, the minimum display resolution allowed by the interface, and the specified interface can be defined in the split-screen configuration file of the interface. The designated interface can be set according to actual needs, for example, a shooting interface is defined as the designated interface.

In step 202, in response to detecting a startup operation for a second user interface of the application, states of components used to display the first user interface and the second user interface are both controlled as a visible state.

It should be noted that the component of the first user interface and the component of the second user interface are Activity components. The user interface whose Activity component is in the visible state may be displayed on the display panel, and the visible state includes the activated state or the paused state. When the life cycle states of the Activity components of the first user interface and the second user interface are both activated state, the first user interface and the second user interface are displayed on the display panel at the same time, and the user can perform respective touch operations on these two user interfaces simultaneously, and they do not affect each other. When the life cycle state of the Activity component of the first user interface is the activated state and the life cycle state of the Activity component in the second user interface is the paused state, the first user interface and the second user interface are simultaneously displayed on the display panel, but the user can perform a touch operation on the first user interface, and cannot perform a touch operation on the second user interface. When the life cycle state of the Activity component of the first user interface is the paused state and the life cycle state of the Activity component of the second user interface is activated, the first user interface and the second user interface are simultaneously displayed on the display panel, but the user can perform a touch operation on the second user interface, and cannot perform a touch operation on the first user interface.

Among them, the second user interface is enabled through the user performing a target touch operation (a startup operation) on the first user interface, so the second user interface is called a sub-interface of the first user interface, and the first user interface is called a main interface of the second user interface. The startup operation can be, but is not limited to, a touch operation to a target control on the first user interface, and an operation to a target sliding track on the first user interface.

Figure 2C:
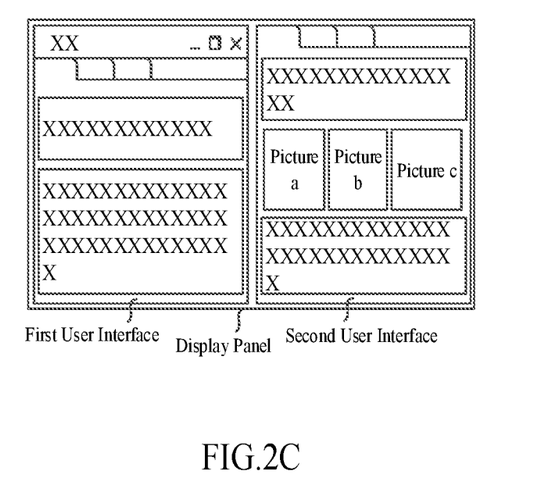
FIG. 2C is a schematic diagram showing another content displayed on a display panel according to one or more examples of the present disclosure.

In one example, before controlling states of the Activity components, it is determined whether the first user interface and the second user interface both comply with respective predefined split-screen display rules. In response to determining that both the first user interface and the second user interface meet the split-screen display rules, the states of the Activity components of the first user interface and the second user interface are set to the visible state, that is, the first user interface and the second user interface are displayed on the display panel at the same time, as shown in FIG. 2C. In response to determining that the first user interface and/or the second user interface do not meet respective predefined split-screen display rules, the state of the Activity component of the first user interface is set as invisible, and the state of the Activity component of the second user interface is set as visible state. At this time, the display panel displays the second user interface, and the second user interface is displayed in full screen mode.

The split-screen display rule of the second user interface may be the same as the split-screen display rule of the first user interface. Taking the split-screen display rule as the minimum display size allowed by the interface is smaller than the split-screen display size as an example, in response to determining that the minimum display size allowed by the first user interface is smaller than the split-screen display size and the minimum display size allowed by the second user interface is smaller than the split-screen display size, indicating that both the first user interface and the second user interface can be displayed normally in the split screen mode, states of Activity components of the first user interface and the second user interface are both set to the visible state to realize the split screen display. In response to determining that the minimum display size allowed by the first user interface is greater than or equal to the split-screen display size, and/or the minimum display size allowed by the second user interface is greater than or equal to the split-screen display size, indicating that the display effect of the first user interface and/or the second user interface in the split screen mode is poor, the state of the Activity component of the first user interface is set to the invisible state, the state of the Activity component of the second user interface is set to the visible state, and the second user interface is displayed in full screen mode.

Taking the split-screen display rule as the minimum display resolution allowed by the interface is less than the split-screen display resolution as an example, in response to determining that the minimum display resolution allowed by the first user interface is less than the split-screen display resolution and the minimum display resolution allowed by the second user interface is less than the split-screen display resolution, indicating that both the first user interface and the second user interface can be displayed normally in the split screen mode, states of Activity components of the first user interface and the second user interface are both set to the visible state to realize the split screen display. In response to determining that the minimum display resolution allowed by the first user interface is greater than or equal to the split-screen display resolution, and/or the minimum display resolution allowed by the second user interface is greater than or equal to the split-screen display resolution, indicating that the display effect of the first user interface and/or the second user interface in the split screen mode is poor, the state of the Activity component of the first user interface is set to the invisible state, the state of the Activity component of the second user interface is set to the visible state, and the second user interface is displayed in full screen mode.

Taking the split-screen display rule as the interface is the designated interface as an example, the designated interface is an interface that can be displayed in split-screen mode. Assuming that the designated interface is a non-shooting interface, all other user interfaces in the application except for the shooting interface can be displayed in split-screen mode, and the shooting interface cannot be displayed in split-screen mode. In response to determining that the first user interface is a personal information display interface, and the second user interface is an address book display interface, that is, the first user interface and the second user interface are both not shooting interfaces, states of Activity components of the first user interface and the second user interface are both set to the visible state to realize split-screen display. In response to determining that the first user interface is the personal information display interface, and the second user interface is the shooting interface, that is, the second user interface cannot be displayed in split-screen mode, the state of the Activity component of the first user interface is set to the invisible state, the state of the Activity component of the second user interface is set to the visible state, and the second user interface is displayed in full screen mode. In response to determining that the first user interface is the shooting interface, and the second user interface is the address book display interface, that is, the first user interface cannot be displayed in split-screen mode, the state of the Activity component of the first user interface is set to the invisible state, the state of the Activity component of the second user interface is set to the visible state, and the second user interface is displayed in full screen mode.

Wherein, the visible state of the Activity component of the second user interface includes the activated state and the paused state. In response to the Activity component of the second user interface is in the activated state, the second user interface can monitor and respond to the user's operation behavior, i.e., the second user interface can be seen and can interact with the user. In response to the Activity component of the second user interface is in the paused state, the second user interface can display content to the user, but cannot monitor and respond to the user's operation behavior, i.e., the second user interface can be seen but cannot interact with the user.

It is understood that, layout parameters of the user interface in the full-screen mode and in the split-screen mode are necessarily different. Therefore, before setting states of the components used to display the first user interface and the second user interface to the visible state, the layout of the user interface should be adjusted.

In response to determining that the first user interface is displayed in full-screen mode in step 201, the interface layout of the first user interface should be adjusted according to first interface layout parameters, and adjust the interface layout of the second user interface according to second interface layout parameters, so that interface layouts of the first user interface and the second user interface are both adjusted to satisfy the split-screen display, and states of Activity components of the layout-adjusted first user interface and the layout-adjusted second user interface are set to the visible state.

In response to determining that the first user interface is displayed in split-screen mode in step 201, that is, the first user interface is displayed in the designated display area of the display panel, the interface layout of the second user interface can be adjusted according to the second interface layout parameters, and the state of the Activity component of the layout adjusted second user interface is set to the visible state, to realize that the second user interface is displayed in another designated display area of the display panel.

Among them, the first interface layout parameters and the second interface layout parameters may include but are not limited to at least one type of the following parameters: width, height, area, and position of the interface; widths, heights, areas, and positions of respective controls in the interface; scaling ratio of the interface; scaling ratio of the control, etc.

In one example, the first interface layout parameters and/or the second interface layout parameters are predefined in a split-screen configuration file. When it is determined that a split-screen display is needed, the first interface layout parameters are obtained from the predefined split-screen configuration file to adjust the interface layout of the first user interface; and the second interface layout parameters are obtained from a predefined split-screen configuration file to adjust the interface layout of the second user interface.

In one example, first interface layout parameters and/or second interface layout parameters are determined according to display parameters of the display panel. The display parameters can include, but are not limited to, width, height, area, and resolution of the display panel. For example, the area in the first interface layout parameters is ½ of the area of the display panel, and the position (i.e., the position of the first user interface represented by the position of the upper left corner of the first user interface) is a pixel position of the upper left corner of the display panel; and the area in the second interface layout parameters is ½ of the area of the display panel, and the position (i.e., the position of the second user interface represented by the position of the upper right corner of the second user interface) is a pixel position of the upper right corner of the display panel.

In one example, the user can specify the first interface layout parameters and/or the second interface layout parameters by himself. Specifically, in response to an interface layout adjustment instruction, an input box for parameter values of the first interface layout parameters and/or the second interface layout parameters are presented. After the user inputting the parameter values, the input box is closed, and the parameter values input by the user are determined as the first interface layout parameters and/or the second interface layout parameters.

In one example, after the first user interface and the second user interface are displayed on the display panel at the same time, according to actual needs, the user can adjust layout of the first user interface and the second user interface through the interface layout adjustment instruction generated by a drag operation, a two-finger pinch operation, etc.

Since the user interface displayed in a Freeform mode can be adapted to various application scenarios, and the operation is flexible and convenient, in any of the above examples, the first user interface and the second user interface can be displayed in the Freeform mode.

After the first user interface and the second user interface are displayed at the same time, if the life cycle state of the component of the first user interface is the activated state and the first user interface has other sub-interfaces, the user can perform a target touch operation on the first user interface to startup other sub-interfaces; if the life cycle state of the component of the second user interface is the activated state and the second user interface has sub-interfaces, the user can perform a target touch operation on the second user interface to startup sub-interfaces of the second user interface. The other sub-interfaces of the first user interface and the sub-interfaces of the second user interface are referred to as third user interfaces below, and the interface display process of the application is further explained.

Figure 3A:
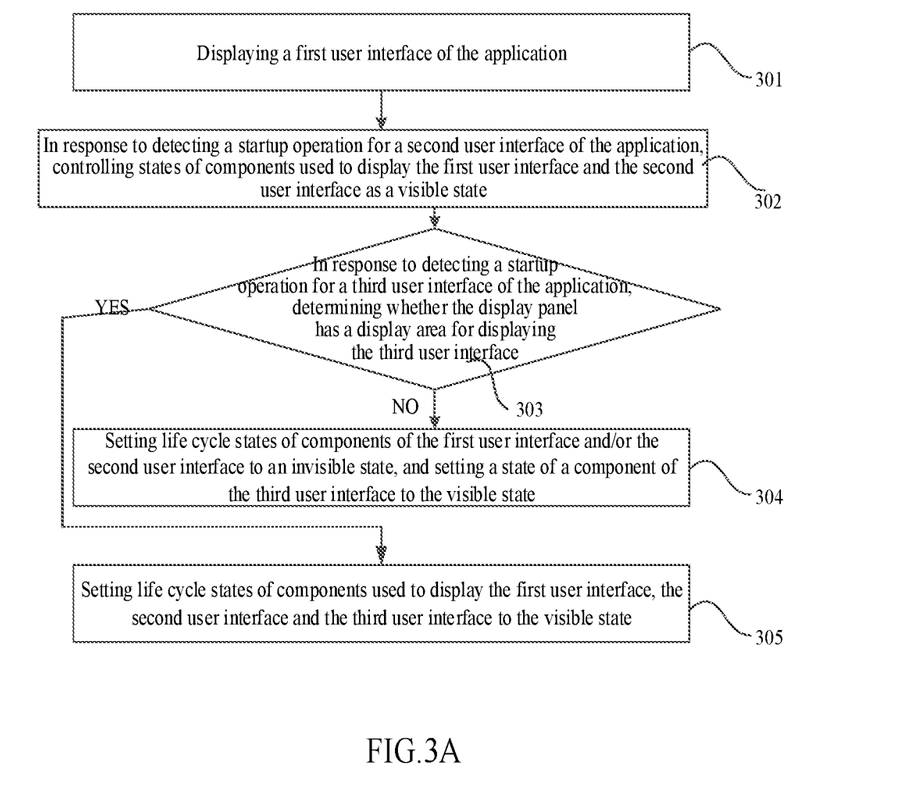
FIG. 3A is a flowchart showing another interface display method of an application according to one or more examples of the present disclosure.

FIG. 3A is a flowchart showing another interface display method of an application interface according to an example of the present disclosure, which include the following steps.

In step 301, a first user interface of the application is displayed.

In step 302, in response to detecting a startup operation for a second user interface of the application, states of components used to display the first user interface and the second user interface are both set as a visible state.

Among them, the specific implementations of step 301 and step 302 are similar to step 201 and step 202, and will not be repeated here.

In step 303, in response to detecting a startup operation for a third user interface of the application, whether the display panel has a display area for displaying the third user interface is determined.

Wherein, the startup operation for the third user interface of the application may be a target touch operation performed by the user on the first user interface, or a target touch operation performed by the user on the second user interface. In response to the startup operation for the third user interface of the application is the target touch operation performed by the user on the first user interface, the third user interface is called a sub-interface of the first user interface, and the first user interface is called the main interface of the third user interface. In response to the startup operation for the third user interface of the application is the target touch operation performed by the user on the second user interface, the second user interface is called a sub-interface of the first user interface, and the first user interface is called the main interface of the second user interface.

The number of user interfaces that the display panel allows to display at the same time can be 2, 3, or even more. In the case where the number of user interfaces that the display panel allows to display at the same time is two, if the current display panel has already displayed the first user interface and the second user interface at the same time, and the startup operation for the third user interface of the application is detected and it is determined that there is no display area for displaying the third user interface on the display panel, then step 304 is executed. In the case where the number of user interfaces that the display panel allows to display at the same time is three, if the current display panel has already displayed the first user interface and the second user interface at the same time, and the startup operation for the third user interface of the application is detected and it is determined that there is a display area for displaying the third user interface on the display panel, then step 305 is executed.

In step 304, states of components of the first user interface and/or the second user interface are set to an invisible state, and a state of a component of the third user interface is set to the visible state.

Since the display panel does not have a display area for displaying the third user interface, the display areas of the first user interface and/or the second user interface needs to be vacated to display the third user interface.

In one example, the display area of an application interface that detects the startup operation of the third user interface is vacated, that is, the state of the component of the application interface (i.e., the first user interface or the second user interface) that detects the startup operation of the third user interface is set to the invisible state, and the state of the component of the third user interface is set to the visible state, so that the third user interface is displayed on the display area located in the application interface where detects the startup operation of the third user interface.

For example, if a startup operation for the third user interface is detected in the first user interface shown in FIG. 2C, the state of the Activity component of the first user interface is set to the invisible state, and the state of the Activity component of the third user interface is set to the visible state, and the state of the Activity component of the second user interface is still visible. Comparing FIG. 2C and FIG. 3B, the display area of the display panel originally used to display the first user interface is now used to display the third user interface, and the display area originally used to display the second user interface is still used to display the second user interface.

Figure 3B:
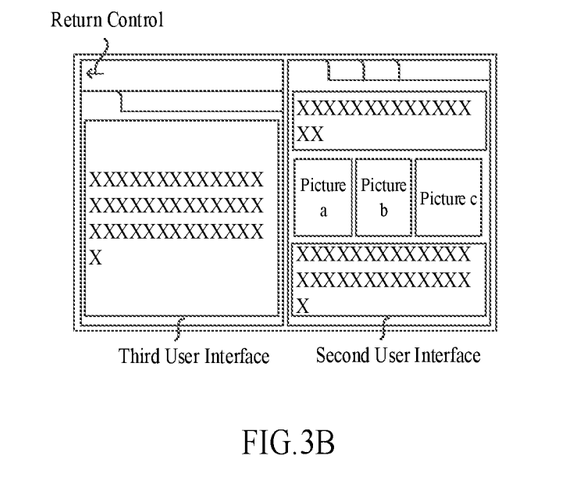
FIG. 3B is a schematic diagram showing another content displayed on a display panel according to one or more examples of the present disclosure.

In order to avoid a phenomenon of interface jumping when displaying the third user interface and thus affecting the user's visual experience, before displaying the third user interface, the interface layout of the third user interface should be adjusted firstly according to the interface layout parameters of the first user interface, and then the state of the Activity component of the layout adjusted third user interface is set to the visible state.

In one example, the display area of an application interface that does not detects the startup operation of the third user interface is vacated, that is, the state of the component of the application interface (i.e., the first user interface or the second user interface) that does not detect the startup operation of the third user interface is set to the invisible state, and the state of the component of the third user interface is set to the visible state, so that the third user interface is displayed on the display area located in the application interface where does not detect the startup operation of the third user interface.

For example, if a startup operation for the third user interface is detected in the first user interface shown in FIG. 2C, the state of the Activity component of the second user interface is set to the invisible state, and the state of the Activity component of the third user interface is set to the visible state, and the state of the Activity component of the first user interface is still visible. Comparing FIG. 2C and FIG. 3C, the display area originally used to display the first user interface is still used to display the first user interface, and the display area of the display panel originally used to display the second user interface is now used to display the third user interface.

Figure 3C:
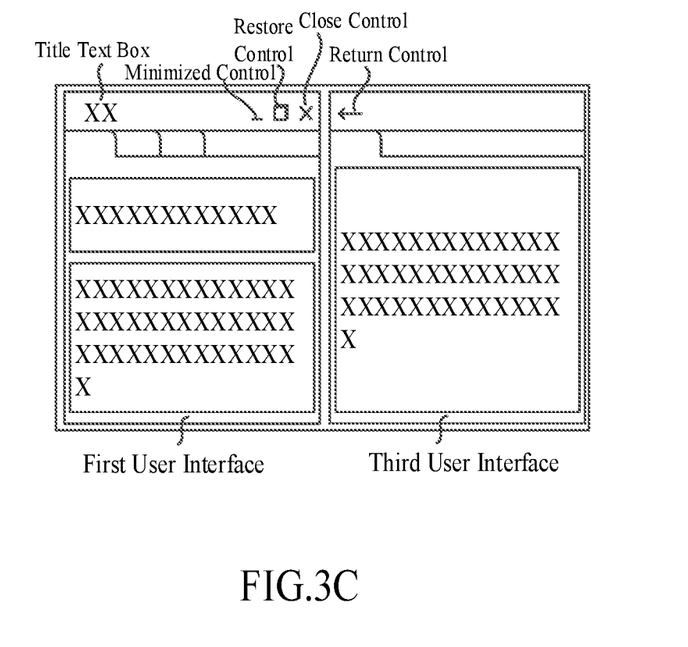
FIG. 3C is a schematic diagram showing another content displayed on a display panel according to one or more examples of the present disclosure.

In order to avoid a phenomenon of interface jumping when displaying the third user interface and thus affecting the user's visual experience, before displaying the third user interface, the interface layout of the third user interface should be adjusted firstly according to the interface layout parameters of the second user interface, and then the state of the Activity component of the third layout-adjusted user interface is set to the visible state.

In one example, regardless of whether the startup operation is detected on the first user interface or the startup operation is detected on the second user interface, the display areas of the first user interface and the second user interface are both vacated, that is, states of the first user interface and the second user interface are both set to the invisible state, and the state of the component of the third user interface is set to the visible state, so that the third user interface covers the first user interface and the second user interface, or the third user interface is displayed in full screen mode.

Figure 3D:
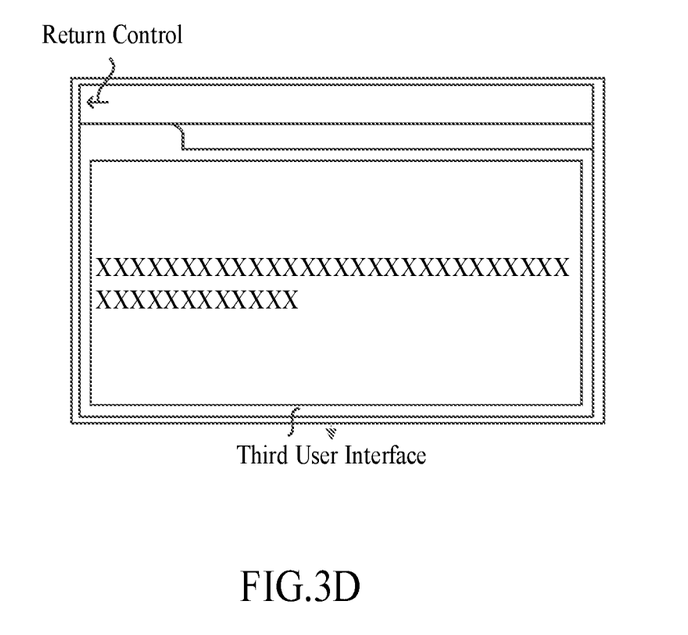
FIG. 3D is a schematic diagram showing another content displayed on a display panel according to one or more examples of the present disclosure.

In one example, before setting states, it is first determined whether the third user interface meets a predefined split-screen display rule. In the case where the third user interface does not meet the predefined split-screen display rule, states of components of the first user interface and the second user interface are set to invisible, and the state of the third user interface is set to visible. Referring to FIG. 3D, the third user interface covers the first user interface and the second user interface, or the third user interface is displayed in full screen mode.

After displaying the third user interface, there is a need to return to the first user interface and the second user interface. If an interface return operation is detected in the third user interface, it is determined whether the component of the first user interface in the invisible state or the component of the second user interface in the invisible state is stored in the local running memory. If the component of the first user interface in the invisible state is stored in the local running memory, the state of the component of the first user interface in the invisible state stored in the local running memory is set to the visible state. If the component of the second user interface in the invisible state is stored in the local running memory, the state of the component of the second user interface in the invisible state stored in the local running memory is set to the visible state. If the component of the first user interface in the invisible state and the component of the second user interface in the invisible state are stored in the local running memory, states of the components of the first user interface and the second user interface in the invisible state stored in the local running memory are set to the visible state.

Wherein, the return operation can be, but is not limited to, the touch operation for the return control in FIG. 3B to FIG. 3D.

When it is detected that the user touches the return control in FIG. 3B, that is, the third user interface and the second user interface are displayed on the display panel and it is detected that the user touches the return control of the third user interface, and it is determined that the Activity component of the first user interface is stored in the local running memory, indicating that the Activity component of the first user interface is not in the demise state and can be restored, in one example, the state of the component of the third user interface is set to the invisible state, and the state of the component of the first user interface stored in the local running memory is set to the visible state, and the state of the component of the second user interface is still in the visible state, so that the display area originally used to display the third user interface is used to display the first user interface, and the first user interface and the second user interface are displayed in the display panel at the same time, that is, the display content of the display panel is switched from FIG. 3B to FIG. 2C; in one example, the state of the component of the third user interface is still visible, and the state of the component of the first user interface stored in the local running memory is set to the visible state, and the state of the component of the second user interface is still visible, so that the display panel displays the first user interface, the second user interface, and the third user interface at the same time, that is, the display content of the panel is switched from FIG. 3B to FIG. 3E.

Figure 3E:
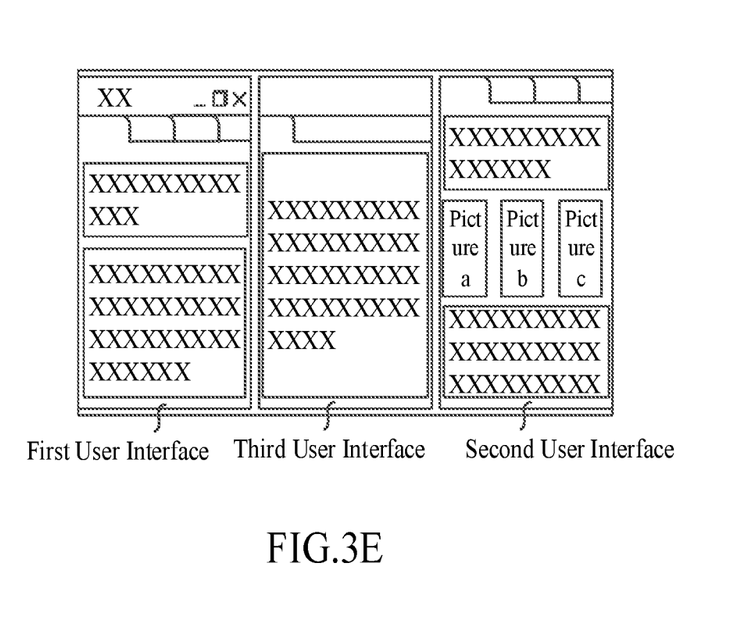
FIG. 3E is a schematic diagram showing another content displayed on a display panel according to one or more examples of the present disclosure.

When it is detected that the user touches the return control in FIG. 3C, that is, the first user interface and the third user interface are displayed on the display panel and it is detected that the user touches the return control of the third user interface, and it is determined that the Activity component of the second user interface is stored in the local running memory, indicating that the Activity component of the second user interface is not in the demise state and can be restored, in one example, the state of the component of the third user interface is set to the invisible state, and the state of the component of the second user interface stored in the local running memory is set to the visible state, and the state of the component of the first user interface is still in the visible state, so that the display area originally used to display the third user interface is used to display the second user interface, and the first user interface and the second user interface are displayed in the display panel at the same time, that is, the display content of the display panel is switched from FIG. 3C to FIG. 2C; in one example, states of components of the third user interface and the first user interface are still visible, and the state of the component of the second user interface stored in the local running memory is set to the visible state, so that the display panel displays the first user interface, the second user interface, and the third user interface at the same time, that is, the display content of the panel is switched from FIG. 3C to FIG. 3E.

When it is detected that the user touches the return control in FIG. 3D, that is, the third user interface is displayed on the display panel and it is detected that the user touches the return control of the third user interface, and it is determined that the Activity components of the first user interface and the second user interface are stored in the local running memory, indicating that the Activity components of the first user interface and the second user interface are not in the demise state and can be restored, in one example, the state of the component of the third user interface is set to the invisible state, and states of components of the first user interface and the second user interface stored in the local running memory are switched to the visible state, so that the first user interface and the second user interface are displayed in the display panel at the same time, that is, the display content of the display panel is switched from FIG. 3D to FIG. 2C; in one example, the state of the component of the third user interface is still visible, and states of components of the first user interface and the second user interface stored in the local running memory are set to the visible state, so that the display panel displays the first user interface, the second user interface, and the third user interface at the same time, that is, the display content of the panel is switched from FIG. 3D to FIG. 3E.

When it is detected that the user touches the return control in FIG. 3D, that is, the third user interface is displayed on the display panel and it is detected that the user touches the return control of the third user interface, and it is determined that the Activity component of the first user interface is stored in the local running memory, but the Activity component of the second user interface is not stored in the local running memory, indicating that the Activity component of the first user interface is not in the demise state and can be restored, but the Activity component of the second user interface is in the demise state and cannot be restored, in one example, the state of the component of the third user interface is set to the invisible state, and the state of the component of the first user interface stored in the local running memory is switched to the visible state, so that the first user interface is displayed in the display panel; in one example, the state of the component of the third user interface is still visible state, and the state of the component of the first user interface stored in the local running memory are set to the visible state, so that the display panel displays the first user interface and the third user interface at the same time.

When it is detected that the user touches the return control in FIG. 3D, that is, the third user interface is displayed on the display panel and it is detected that the user touches the return control of the third user interface, and it is determined that the Activity component of the first user interface is not stored in the local running memory, and the Activity component of the second user interface is not stored in the local running memory too, indicating that Activity components of the first user interface and the second user interface are both in the demise state and cannot be restored, so exit the application.

In step 305, states of components used to display the first user interface, the second user interface, and the third user interface are set to the visible state.

Referring to FIG. 3E, the first user interface, the second user interface, and the third user interface are displayed on the display panel at the same time. It should be noted that the layout of the three user interfaces is not limited to the left, center, and right arrangement shown in FIG. 3E. The top, middle and bottom arrangements, as well as other arrangements, are not particularly limited in the present disclosure.

Similar to the first user interface and the second user interface, the third user interface can also be displayed in a Freefrom mode.

Similar to the second user interface, if the display panel displays the first user interface and/or the second user interface while displaying the third user interface, then before setting the state of the component of the third user interface to the visible state, the state of a target control in the third user interface is set to a hidden state, and then the state of the component of the third user interface hidden by the control is set to the visible state, so that when the multiple user interfaces are displayed at the same time, only one user interface displays the target control. The user interface that displays the target control is generally the main interface of other user interfaces in the visible state.

In one example, the target control of the sub-interface in the currently displayed user interface is hidden. In case that the second user interface is a sub-interface of the first user interface, before setting the state of the component of the second user interface to the visible state, the state of the target control in the second user interface is set to the hidden state, and then the state of the component of the second user interface hidden by the control is set to the visible state. Wherein, the target control is controls having the same functions as functions of all controls in the first user interface. For example, it may be a text box for displaying a page title, a minimized control, a restore control, a close control, and so on. Referring to FIG. 3C or FIG. 3E, the target control is displayed in the first user interface (i.e., main interface), not displayed in the second user interface (sub-interface of the first user interface) and the third user interface (sub-interface of the first user interface), which on the one hand can simplify the content displayed on the second user interface and is more attractive; on the other hand, it can reduce the risk of accidental touch of the target control.

In any of the above examples, the state setting of respective components of the user interfaces can be realized by, but not limited to, function calls. For example, by calling functions onPause( )→onResume( ) in turn, the user interface in the stopped state (i.e., invisible state) is set to the activated state (i.e., visible state), and by calling functions onPause( )→onStop( ) in turn, the user interface in the activated state (i.e., visible state) is set to the stopped state (i.e., invisible state).

Corresponding to the foregoing example of the interface display method of the application, the present disclosure also provides an example of an interface display apparatus of an application.

Figure 4:
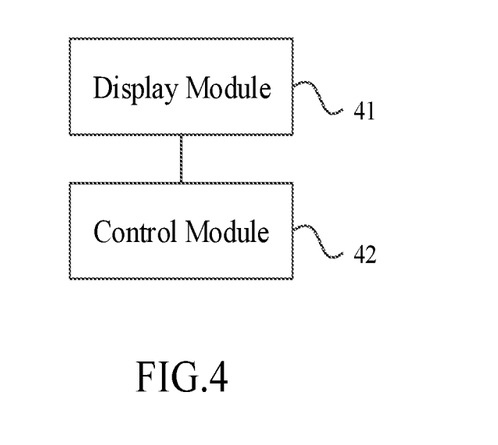
FIG. 4 is a schematic diagram of modules of an interface display apparatus of an application according to one or more examples of the present disclosure.

FIG. 4 is a schematic diagram showing modules of an interface display apparatus of an application according to an example of the present disclosure, and the interface display apparatus includes a display module 41, a control module 42.

The display module 41 is configured to display a first user interface of the application.

The control module 42 is configured to control states of components used to display the first user interface and the second user interface as a visible state in response to detecting a startup operation for a second user interface of the application, so that the first user interface and the second user interface are simultaneously displayed on a display panel, and the second user interface is a sub-interface of the first user interface.

Alternatively, the control module 42 is configured to: determine whether both the first user interface and the second user interface meet respective predefined split-screen display rules; and in case that both the first user interface and the second user interface meet the respective predefined split-screen display rules, setting states of components of the first user interface and the second user interface to the visible state.

Alternatively, the control module 42 is configured to: adjust an interface layout of the first user interface according to first interface layout parameters; adjust an interface layout of the second user interface according to second interface layout parameters; and set states of the components of the layout-adjusted first user interface and the second user interface to the visible state.

Alternatively, the first interface layout parameters and the second interface layout parameters are determined from a predefined split-screen configuration file; or the first interface layout parameters and the second interface layout parameters are determined according to display parameters of the display panel; or the first interface layout parameters and the second interface layout parameters are determined according to a received interface layout adjustment instruction, and the interface layout adjustment instruction is configured to adjust interface layouts of the first user interface and/or the second user interface.

Alternatively, the interface display apparatus of the application further includes a detecting module, which is configured to determine whether the display panel has a display area for displaying the third user interface, in response to detecting a startup operation for a third user interface of the application. The control module 42 is further configured to in case that determining there is no display area for displaying the third user interface, set states of components of the first user interface and/or the second user interface to an invisible state, and set a state of a component of the third user interface to the visible state, wherein the third user interface is a sub-interface of the first user interface or the second user interface.

Alternatively, when the state of the component of the third user interface is set to the visible state, the control module 42 is further configured to: in case that the state of the component of the first user interface is set to the invisible state, adjust an interface layout of the third user interface according to first interface layout parameters of the first user interface, and set the state of the component of the layout-adjusted third user interface to the visible state; or in case that the state of the component of the second user interface is set to the invisible state, adjust an interface layout of the third user interface according to second interface layout parameters of the second user interface, and set the state of the component of the layout-adjusted third user interface to the visible state; or in case that states of components of the first user interface and the second user interface are set to the invisible state, adjust an interface layout of the third user interface according to first interface layout parameters and the second interface layout parameters, and set the state of the component of the layout-adjusted third user interface to the visible state.

Alternatively, the control module 42 is further configured to: in case that the third user interface detects an interface return operation, determine whether the component of the first user interface in the invisible state and/or the component of the second user interface in the invisible state are stored in a local running memory; and in response to determining that the component of the first user interface in the invisible state and/or the component of the second user interface in the invisible state are stored in the local running memory, set states of the component of the first user interface in the invisible state and/or the component of the second user interface in the invisible state to the visible state.

Alternatively, the first user interface and the second user interface are displayed in a Freeform mode.

Alternatively, the interface display apparatus of the application further includes a hiding module, which is configured to hide the target control of the sub-interface in user interfaces currently displayed on the display panel.

Regarding the apparatus in the foregoing example, the specific manner in which each module performs operation has been described in detail in the example of the method, and detailed description will not be given here.

For the apparatus examples, since it basically corresponds to the method example, the relevant part can refer to the part of the description of the method example. The apparatus examples described above are merely illustrative. The modules described as separate components may or may not be physically separated, and the components displayed as modules may or may not be physical modules, that is, they may be located in one place, or they can be distributed to multiple network modules. Some or all of the modules can be selected according to actual needs to achieve the objectives of the solutions of the examples. Those of ordinary skill in the art can understand and implement without creative work.

The example of the present disclosure also proposes an electronic device, which may include a processor; and memory for storing processor executable instructions. The processor is configured to implement the interface display method of the application described in any of the foregoing examples.

The example of the present disclosure also proposes a computer-readable storage medium on which a computer program is stored, and when the computer program is executed by a processor, the steps in the interface display method of the application described in any of the foregoing examples are implemented.

The technical solution provided by the examples of the present disclosure may include the following beneficial effects.

By controlling life cycle state of the component used to display the user interface, when displaying the sub-interface of a certain user interface of the application is triggered, the certain display interface and its sub-interface can be displayed on the display panel at the same time, thus avoiding the sub-interface coverage the certain display interface and facilitating the user to view information on respective user interfaces. At the same time, the user can operate the more user interfaces on the screen at the same time, which is conducive to simplifying the user's operation and bringing great convenience to the user.

Furthermore, by controlling life cycle states of components used to display the user interface, the split-screen display between multiple user interfaces of the application is realized, which brings great convenience to the user.

Figure 5:
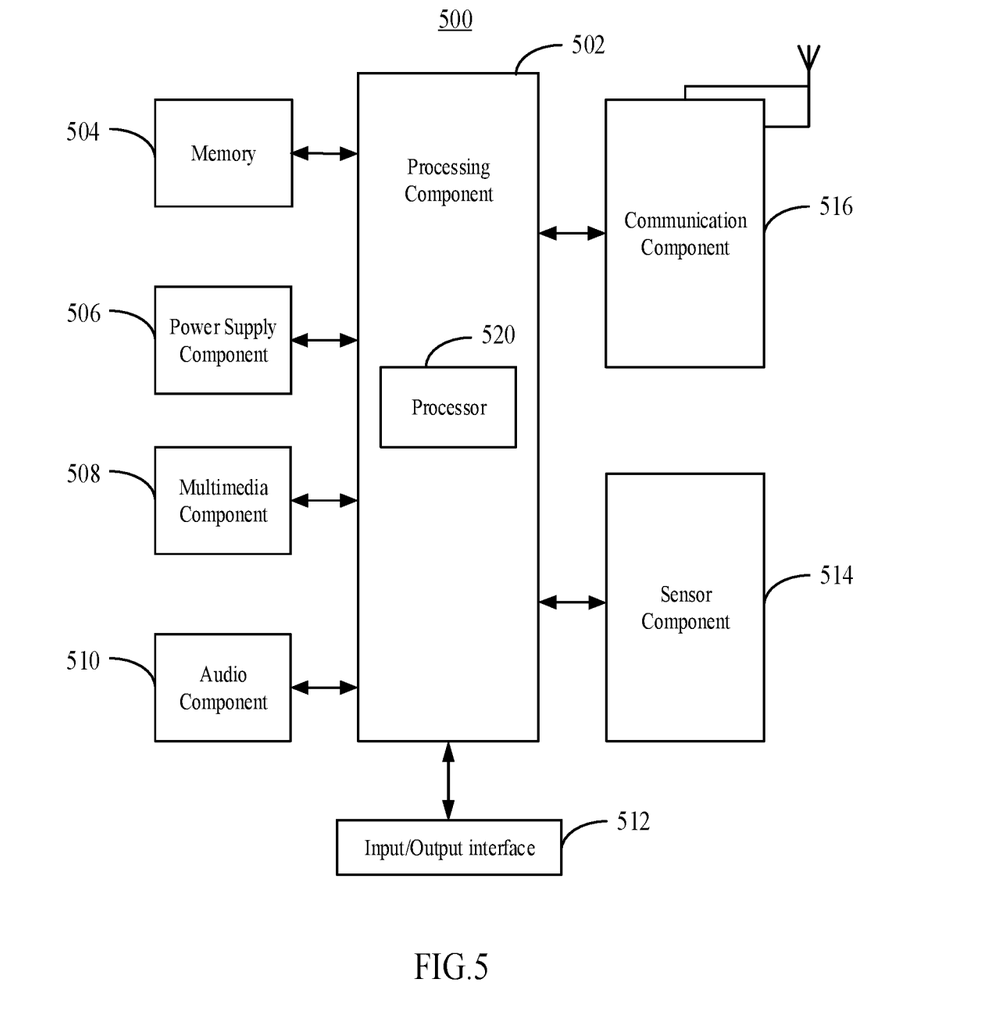
FIG. 5 is a block diagram showing a device for displaying an application in an interface according to one or more examples of the present disclosure.

FIG. 5 is a block diagram showing a device 500 for displaying an application in an interface according to an example of the present disclosure. For example, the device 500 may be a mobile phone, a computer, a digital broadcasting terminal, a messaging device, a game console, a tablet device, a medical device, a fitness device, a personal digital assistant, etc.

Referring to FIG. 5, the device 500 may include one or more of the following components: a processing component 502, a memory 504, a power supply component 506, a multimedia component 508, an audio component 510, an input/output (I/O) interface 512, a sensor component 514, and a communication component 516.

The processing component 502 generally controls the overall operations of the device 500, such as operations associated with displaying, telephone calls, data communication, camera operations, and recording operations. The processing component 502 may include one or more processors 520 to execute instructions to complete all or part of the steps in the above method. In addition, the processing component 502 may include one or more modules to facilitate interaction between the processing component 502 and other components. For example, the processing component 502 may include a multimedia module to facilitate interaction between the multimedia component 508 and the processing component 502.

The memory 504 is configured to store various types of data to support operations at the device 500. Examples of these data include instructions for any application or method operating on the device 500, contact data, phone book data, messages, pictures, videos, and so on. The memory 504 may be implemented by any type of volatile or non-volatile storage device or a combination of the any type of volatile or non-volatile storage device, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 506 provides power to various components of the device 500. The power supply component 506 may include a power supply management system, one or more power supplies, and other components associated with generating, managing, and distributing power for the device 500.

The multimedia component 508 includes a screen that provides an output interface between the device 500 and the user. In some examples, the screen may include a liquid crystal display (LCD) and a touch panel (TP). If the screen includes a touch panel, then the screen may be implemented as a touch screen to receive input signals from the user. The touch panel includes one or more touch sensors, to sense touching, swiping, and gestures on the touch panel. The touch sensor may not only sense a boundary of the touching operation or swiping operation, but also detect a duration and pressure related to the touching operation or swiping operation. In some examples, the multimedia component 508 includes a front camera and/or a rear camera. When the device 500 is in an operation mode, such as a shooting mode or a video mode, the front camera and/or the rear camera may receive external multimedia data. Each of the front camera and rear camera may be a fixed optical lens system or have focal length and optical zoom capabilities.

The audio component 510 is configured to output and/or input audio signals. For example, the audio component 510 includes a microphone (MIC). When the device 500 is in an operation mode, such as a call mode, a recording mode, and a voice recognition mode, the microphone is configured to receive an external audio signal. The received audio signal may be further stored in the memory 504 or transmitted via the communication component 516. In some examples, the audio component 510 further includes a speaker for outputting audio signals.

The I/O interface 512 provides an interface between the processing component 502 and a peripheral interface module. The peripheral interface module may be a keyboard, a click wheel, a button and so on. These buttons may include, but are not limited to: home button, volume button, start button, and lock button.

The sensor assembly 514 includes one or more sensors for providing the status assessment of various aspects for the device 500. For example, the sensor component 514 can detect the on/off state of the device 500, and the relative positioning of the components, for example, the component is a display and a keypad of the device 500, and the sensor component 514 can also detect the position change of the device 500 or a component of the device 500, the presence or absence of user contact with the device 500, the orientation or acceleration/deceleration of the device 500, and the temperature change of the device 500. The sensor assembly 514 may include a proximity sensor configured to detect the presence of nearby objects without any physical contact. The sensor assembly 514 may also include a light sensor, such as a CMOS or CCD image sensor, for use in imaging applications. In some examples, the sensor assembly 514 may also include an acceleration sensor, a gyro sensor, a magnetic sensor, a pressure sensor, or a temperature sensor.

The communication component 516 is configured to facilitate wired or wireless communication between the device 500 and other devices. The device 500 can access a wireless network based on a communication standard, such as WiFi, 2G, or 3G, or a combination of the communication standard. In an example, the communication component 516 receives a broadcast signal or broadcast related information from an external broadcast management system via a broadcast channel. In an example, the communication component 516 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example, the device 500 may be implemented by one or more application specific integrated circuits (ASICs), digital signal processors (DSPs), digital signal processing devices (DSPDs), programmable logic devices (PLDs), Field programmable gate array (FPGA), controller, microcontroller, microprocessor or other electronic components, to execute the interface display method described in any of the above examples.

In an example, there is also provided a non-transitory computer-readable storage medium including instructions, such as a memory 504 including instructions, which can be executed by the processor 520 of the device 500 to complete the above method. For example, the non-transitory computer-readable storage medium may be ROM, random access memory (RAM), CD-ROM, magnetic tape, floppy disk, optical data storage device, or the like.

Those skilled in the art will easily think of other examples of the present disclosure after considering the specification and practicing the invention disclosed herein. This application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the examples are to be regarded as exemplary only, and the true scope and spirit of the present disclosure are pointed out by the following claims.

It should be understood that the present disclosure is not limited to the precise structure that has been described above and shown in the drawings, and various modifications and changes can be made without departing from its scope. The scope of the present disclosure is only limited by the appended claims.

What is claimed is:

1. An interface display method for an application, comprising:
    displaying a first user interface of the application;
    in response to detecting a startup operation for a second user interface of the application, controlling states of components used to display the first user interface and the second user interface as a visible state, wherein the visible state comprises an activated state and a paused state,
        when the life cycle state of the activity component of the first user interface is the activated state and the life cycle state of the activity component of the second user interface is the paused state, the first user interface and the second user interface are simultaneously displayed on the display panel, but the user can perform a touch operation on the first user interface, and cannot perform a touch operation at any point in the second user interface;
        when the life cycle state of the activity component of the first user interface is the paused state and the life cycle state of the activity component of the second user interface is the activated state, the first user interface and the second user interface are simultaneously displayed on the display panel, but the user can perform a touch operation on the second user interface, and cannot perform a touch operation at any point in the first user interface, and
    the second user interface is a sub-interface of the first user interface;

determining that the life cycle state of the activity component of the first user interface is the activated state and the first user interface has other sub-interfaces, and starting up a third user interface in response to a target touch operation on the first user interface, the third user interface being one of the sub-interfaces of the first user interface; or determining that the life cycle state of the activity component of the second user interface is the activated state and the second user interface has other sub-interfaces, and starting up a third user interface in response to a target touch operation on the second user interface, the third user interface being one of the sub-interfaces of the second user interface; and adjusting interface layout of the third user interface according to interface layout parameters of the first user interface or the second user interface, and displaying the layout adjusted third user interface, wherein the adjusting is performed before the displaying so that a phenomenon of interface jumping when displaying the third user interface is avoided;

wherein the method further comprises:
in response to the first user interface or second user interface being partially obscured by a pop-up window, switching the life cycle state of the activity component of the first user interface or second user interface from the activated state to the paused state, wherein the first user interface or the second user interface in the paused state is visible but not available for user interaction, and wherein one activity component corresponds to one user interface.

2. The interface display method according to claim 1, wherein controlling the states of components used to display the first user interface and the second user interface as the visible state comprises:
adjusting a first interface layout of the first user interface according to first interface layout parameters;
adjusting a second interface layout of the second user interface according to second interface layout parameters; and
setting states of the components of layout-adjusted first user interface and second user interface to the visible state.

3. The interface display method according to claim 2, wherein the first interface layout parameters and the second interface layout parameters are determined based on at least one of following: a predefined split-screen configuration file, display parameters of the display panel, or a received interface layout adjustment instruction; and
wherein the interface layout adjustment instruction is configured to adjust interface layouts of the first user interface and/or the second user interface.

4. The interface display method according to claim 1, wherein the first user interface and the second user interface are displayed in a Freeform mode.

5. The interface display method according to claim 4, further comprising:
hiding target control of the sub-interface in user interfaces currently displayed on the display panel.

6. The interface display method according to claim 1, wherein controlling the states of components used to display the first user interface and the second user interface as the visible state comprises:
determining whether both the first user interface and the second user interface meet respective predefined split-screen display rules, the predefined split-screen display rule comprising: a minimum display resolution allowed by an interface is smaller than a split-screen display resolution; and in case that the minimum display resolution allowed by the first user interface is smaller than the split-screen display resolution and the minimum display resolution allowed by the second user interface is smaller than the split-screen display resolution, setting the states of components of the first user interface and the second user interface to the visible state.

7. The interface display method according to claim 1, wherein the method further comprises:
in response to detecting the target touch operation on the first user interface, determining whether the display panel has a display area for displaying the third user interface; and in response to determining no display area for displaying the third user interface, setting a state of a component of the second user interface that does not detect the target touch operation to the invisible state, and setting a state of a component of the third user interface to the visible state; or in response to detecting the target touch operation on the second user interface, determining whether the display panel has a display area for displaying the third user interface; and in response to determining no display area for displaying the third user interface, setting a state of a component of the first user interface that does not detect the target touch operation to the invisible state, and setting a state of a component of the third user interface to the visible state.

8. The interface display method according to claim 7, further comprising:
in case that the third user interface detects an interface return operation, determining whether the component of the first user interface in the invisible state or the component of the second user interface in the invisible state are stored in a local running memory; and in response to determining that the component of the first user interface in the invisible state or the component of the second user interface in the invisible state are stored in the local running memory, setting states of the component of the first user interface in the invisible state or the component of the second user interface in the invisible state to the visible state.

9. An electronic device, comprising:
a processor; and
memory for storing instructions executable by the processor;
wherein the processor is configured to:
display a first user interface of the application;
in response to detecting a startup operation for a second user interface of the application, control states of components used to display the first user interface and the second user interface as a visible state, wherein
the visible state comprises an activated state and a paused state,
when the life cycle state of the activity component of the first user interface is the activated state and the life cycle state of the activity component of the second user interface is the paused state, the first user interface and the second user interface are simultaneously displayed on the display panel, but the user can perform a touch operation on the first user interface, and cannot perform a touch operation at any point in the second user interface;

when the life cycle state of the activity component of the first user interface is the paused state and the life cycle state of the activity component of the second user interface is the activated state, the first user interface and the second user interface are simultaneously displayed on the display panel, but the user can perform a touch operation on the second user interface, and cannot perform a touch operation at any point in the first user interface, and the second user interface is a sub-interface of the first user interface;

determining that the life cycle state of the activity component of the first user interface is the activated state and the first user interface has other sub-interfaces, and starting up a third user interface in response to a target touch operation on the first user interface, the third user interface being one of the sub-interfaces of the first user interface; or determining that the life cycle state of the activity component of the second user interface is the activated state and the second user interface has other sub-interfaces, and starting up a third user interface in response to a target touch operation on the second user interface, the third user interface being one of the sub-interfaces of the second user interface; and adjusting interface layout of the third user interface according to interface layout parameters of the first user interface or the second user interface, and displaying the layout adjusted third user interface, wherein the adjusting is performed before the displaying so that a phenomenon of interface jumping when displaying the third user interface is avoided;

wherein the processor is further configured to:

in response to the first user interface or second user interface being partially obscured by a pop-up window, switch the life cycle state of the activity component of the first user interface or second user interface from the activated state to the paused state, wherein the first user interface or the second user interface in the paused state is visible but not available for user interaction, and wherein one activity component corresponds to one user interface.

10. The electronic device according to claim 9, wherein the processor is configured to:

adjust a first interface layout of the first user interface according to first interface layout parameters;

adjust a second interface layout of the second user interface according to second interface layout parameters; and set states of the components of layout-adjusted first user interface and second user interface to the visible state.

11. The electronic device according to claim 10, wherein the first interface layout parameters and the second interface layout parameters are determined based on at least one of following: a predefined split-screen configuration file, display parameters of the display panel, or a received interface layout adjustment instruction; and wherein the interface layout adjustment instruction is configured to adjust interface layouts of the first user interface and/or the second user interface.

12. The electronic device according to claim 9, wherein the first user interface and the second user interface are displayed in a Freeform mode.

13. The electronic device according to claim 12, wherein the processor is further configured to hide target control of the sub-interface in user interfaces currently displayed on the display panel.

14. The electronic device according to claim 9, wherein the processor is further configured to:

determine whether both the first user interface and the second user interface meet respective predefined split-screen display rules, the predefined split-screen display rule comprising: a minimum display resolution allowed by an interface is smaller than a split-screen display resolution; and in case that the minimum display resolution allowed by the first user interface is smaller than the split-screen display resolution and the minimum display resolution allowed by the second user interface is smaller than the split-screen display resolution, set the states of components of the first user interface and the second user interface to the visible state.

15. The electronic device according to claim 9, wherein the processor is further configured to:

in response to detecting the target touch operation on the first user interface, determine whether the display panel has a display area for displaying the third user interface; and in response to determining no display area for displaying the third user interface, set a state of a component of the second user interface that does not detect the target touch operation to the invisible state, and set a state of a component of the third user interface to the visible state; or in response to detecting the target touch operation on the second user interface, determine whether the display panel has a display area for displaying the third user interface; and in response to determining no display area for displaying the third user interface, set a state of a component of the first user interface that does not detect the target touch operation to the invisible state, and set a state of a component of the third user interface to the visible state.

16. The electronic device according to claim 15, wherein the processor is further configured to:

in case that the third user interface detects an interface return operation, determine whether the component of the first user interface in the invisible state or the component of the second user interface in the invisible state are stored in a local running memory; and in response to determining that the component of the first user interface in the invisible state or the component of the second user interface in the invisible state are stored in the local running memory, set states of the component of the first user interface in the invisible state or the component of the second user interface in the invisible state to the visible state.

17. A non-transitory computer-readable storage medium, wherein the instructions in the storage medium, when executed by a processor, cause the processor to perform acts comprising:

displaying a first user interface of an application;

in response to detecting a startup operation for a second user interface of the application, controlling states of components used to display the first user interface and the second user interface as a visible state, wherein the visible state comprises an activated state and paused state, when the life cycle state of the activity component of the first user interface is the activated state and the life cycle state of the activity component of the second user interface is the paused state, the first user interface and the second user interface are simultaneously displayed on the display panel, but the user can perform a touch operation on the first user interface, and cannot perform a touch operation at any point in the second user interface;

when the life cycle state of the activity component of the first user interface is the paused state and the life cycle state of the activity component of the second user interface is the activated state, the first user interface and the second user interface are simultaneously displayed on the display panel, but the user can perform a touch operation on the second user interface, and cannot perform a touch operation at any point in the first user interface, and the second user interface is a sub-interface of the first user interface;

determining that the life cycle state of the activity component of the first user interface is the activated state and the first user interface has other sub-interfaces, and starting up a third user interface in response to a target touch operation on the first user interface, the third user interface being one of the sub-interfaces of the first user interface; or determining that the life cycle state of the activity component of the second user interface is the activated state and the second user interface has other sub-interfaces, and starting up a third user interface in response to a target touch operation on the second user interface, the third user interface being one of the sub-interfaces of the second user interface; and adjusting interface layout of the third user interface according to interface layout parameters of the first user interface or the second user interface, and displaying the layout adjusted third user interface, wherein the adjusting is performed before the displaying so that a phenomenon of interface jumping when displaying the third user interface is avoided;

wherein the processor is further configured to:

in response to the first user interface or second user interface being partially obscured by a pop-up window, switch the life cycle state of the activity component of the first user interface or second user interface from the activated state to the paused state, wherein the first user interface or the second user interface in the paused state is visible but not available for user interaction, and wherein one activity component corresponds to one user interface.

* * * * *